Dec. 21, 1965  J. L. JOHNSON, JR., ET AL  3,224,076

METHOD OF MAKING A COMMUTATOR

Filed March 1, 1962

INVENTORS
JAMES L. JOHNSON JR.
LLOYD J. KRULL
BY
Charles L. Lovercheck
attorney

United States Patent Office 3,224,076
Patented Dec. 21, 1965

3,224,076
METHOD OF MAKING A COMMUTATOR
James L. Johnson, Jr., Ripley, N.Y., and Lloyd J. Krull, Erie, Pa., assignors to The Electric Materials Co., Erie, Pa., a corporation of Pennsylvania
Filed Mar. 1, 1962, Ser. No. 176,664
2 Claims. (Cl. 29—155.54)

This invention relates to commutators and, more particularly, to commutators for direct current dynamoelectric machinery.

The commutator disclosed herein is made by drawing special commutator copper into bars with a fin on the thick edge. This fin is drawn to a size so that it will fit into the internal grooves in the building ring. This holds the bars in fixed spaced relation and provides a simple efficient support. The bars are held together by rings reinforced with glass fibers wound and placed on each end of the commutator bars in the slots provided. These rings provide the strength to withstand centrifugal force to which the commutator is subjected in use. The bars have a spot of epoxy placed thereon to separate them and they are placed in a mold and clamped together and O-rings are used to seal the joints in the mold so there is no leakage of epoxy from the mold when the commutator is being filled.

The method disclosed herein is carried out as follows:

The commutator bar stock is produced with a rib on the thick edge. When the stock is cut or punched into commutator segments, the rib on each segment fits into a corresponding groove milled or shaped in the inner surface of the building ring and is ninety degrees to its circumference. These grooves are equally spaced and are equal to the number of copper segments to be contained in the commutator.

At the time the segments are produced from the bar stock, notches are punched in both ends of each segment. These notches are of sufficient size to accommodate a reinforcing ring which is fitted in place after the segments are positioned in the building ring.

Prior to fitting or stacking the copper segments in the building ring, a small non-conducting spacer is attached to the side of each. This may be done by one of the following methods:

(1) Punching a hole through the copper segment into which is pressed a shouldered bushing;
(2) Placing a drop of epoxy non-conducting material on the surface of the segment which, upon curing, will act as a spacer; or
(3) Attaching a non-conducting material to the surface of the segment by means of adhesive.

The method used is of less importance than the fact that all spacers should be equal in thickness for the spacers, in combination with the fit of the ribs in the grooves of the building ring, serve to register or position each segment properly to prevent skewing or misalignment.

After all segments have been stacked in the building ring, reinforcing rings made of a non-conducting material are fitted into the annular grooves produced by the notches on either end of the copper segments.

The stud is fitted into the center of the hole of the bottom mold plate and the commutator is positioned in the recess of the bottom plate. A steel sleeve is then slid over the stud. This sleeve becomes the center bushing of the commutator. The top mold plate is placed in position and the mold is secured by tightening a nut on the threaded portion of the stud. The assembly is air tight.

Liquid epoxy is poured into vent holes located in the top mold plate until the mold is full. The liquid epoxy fills the voids between all copper segments and between the segments and the stud sleeve or bushing and fills the annular groove. This, in effect, produces a one piece epoxy casting which bonds to the copper and stud and embeds the reinforcing rings. The mold is placed in a vacuum tank to evacuate all air from the liquid epoxy. The mold is then placed in an oven to cure or soldify the epoxy.

After the epoxy has been cured, the mold is disassembled, the commutator removed, and such machining operations performed to the exposed surfaces as may be necessary to complete the commutator.

The center of the commutator is formed by a sleeve of steel. This sleeve serves as a bushing which can be pressed onto the armature shaft of a motor or generator.

By constructing a commutator in the manner aforesaid, the cost of the commutator in a particular sized range can be reduced over prior methods, better bar alignment can be achieved, and the bars are not skewed nor destroyed during high speed operation. Higher bar to ground voltages are possible and less equipment is necessary to manufacture the commutator and machining of the commutator is reduced to a minimum.

It is, accordingly, an object of the present invention to provide an improved commutator and method for making the same.

Another object of the invention is to provide a fixture for making an improved commutator.

A further object of the invention is to provide a commutator which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
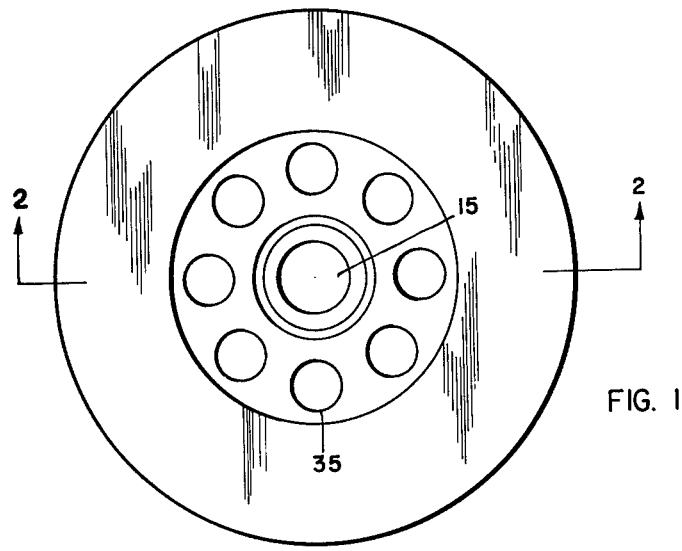
FIG. 1 is a top view of a fixture according to the invention.
Figure 2:
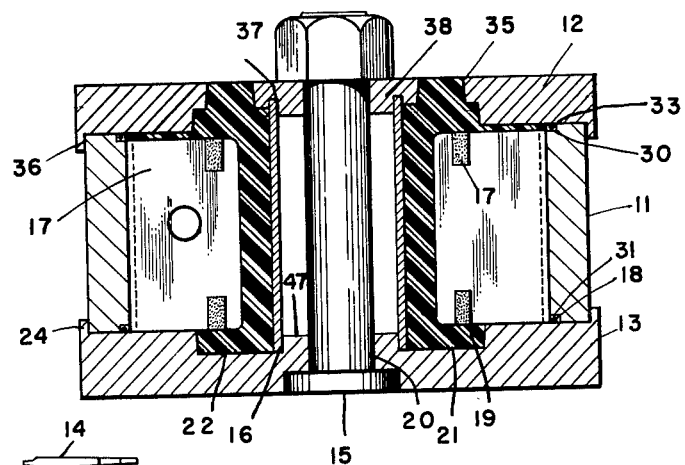
FIG. 2 is a cross sectional view taken on line 2—2 of FIG. 1.
Figure 5:
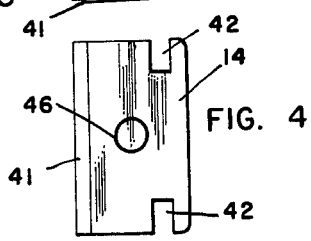
FIG. 5 is an end view of the bar shown in FIG. 4.
Figure 4:
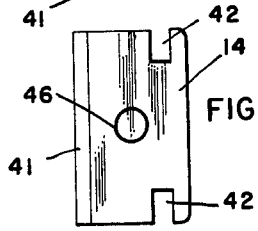
FIG. 4 is a detailed side view of one of the commutator bars.
Figure 3:
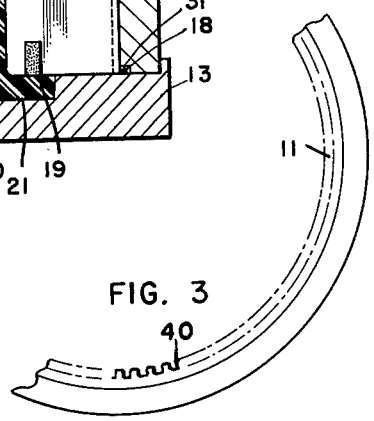
FIG. 3 is a partial top view of the building ring.

Now with more particular reference to the drawing, the mold is made up generally of a building ring 11 which is closed at one side by a bottom plate 13 and at the other side by a top plate 12 with a tubular steel sleeve 16 supported therebetween. The bottom plate and top plate are held in clamped relation by a stud 15.

The bottom plate 13 is in the form of a disk having a hole 20 at the center thereof which receives the body of the stud 15. The building ring has a counterbore for receiving the head of the stud. A groove 21 is formed in the inside of the bottom plate 13 concentric to the hole 20 and this groove forms a cavity for receiving epoxy 19. The epoxy flows into the groove 21 and forms a flange 22 outside the sleeve 16. A vertically extending flange 24 is formed on the bottom plate 13 and this flange forms a barrier inside of which is received the building ring 11.

The building ring 11 is in the form of a hollow cylinder and it has internal grooves 30 and 31 formed at opposite sides thereof. These grooves receive O-rings 18 and 33 which lie against the inner surface of the bottom plate 13 and the top plate 12 to form a seal and thereby prevent the escape of resin. The O-rings can be of an elastomer material resistant to attack by material made of epoxy resin.

The top plate 12 has spaced holes 35 therein and these holes may be used to insert the epoxy. The top plate 12 is in the form of a flat disk and has a vertically extending flange 36 which forms a barrier for the building ring 11. The top plate has a groove 37 which is concentric to a hole 38 and the groove 37 receives one end of the steel sleeve 16.

Commutator bars 14 are provided with recesses 46 which receive buttons of epoxy material and these buttons form spaces for the epoxy material as well as insulation between the bars.

Fins 41 are adapted to fit into peripheral grooves 40 inside the building ring 11 to positively locate the commutator bars 14 to hold them in radial relation to the building ring.

The mold may be used by supporting the relatively thin tubular sleeve on a boss 47 with the building ring 11 inside the flange 24. The bars 14 with a drop of resin 46 on each are then placed with their fins 41 in the grooves 40. Fiberglass tape is wound in notches 42. The steel sleeve 16 will then be inserted in the groove 37 and fit around the boss 47. The top plate 12 will then be put in place with the upper end of the nut on the stud 15 tightened, the epoxy can then be introduced through the holes 35, and the device will be ready for curing. This can be done with the mold in a vacuum to secure better penetration.

When the molded commutator is cured, it can be removed from the mold by removing the stud 15. Then the fins 41 can be machined off to provide a smooth brush surface and the commutator will be ready to be pressed onto a shaft of an armature for use.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A method of making a commutator comprising providing a building ring having a generally cylindrical hollow with peripherally spaced axially extending grooves in the inner periphery thereof for receiving fins on commutator bars, providing commutator bars having fins on one side edge and axially extending notches in their ends, inserting said commutator bars in said ring with said fins in said grooves whereby said bars are held in circumferentially spaced relation, applying an impregnated glass tape in said notches thereby forming a band locating said commutator bars against radial movement, closing said building ring by application of a top plate and a bottom plate, said top plate being provide with an aperture, filling said spaces between said bars with an epoxy resin, through said aperture, curing said resin, removing said ring and cover plates and removing said fins from said bars.

2. The method recited in claim 1 wherein
a small quantity of resin is adhered to a side of each said bar before said bars are placed in said ring whereby said bars are held in spaced relation.

References Cited by the Examiner
UNITED STATES PATENTS

| | | |
|---|---|---|
| 1,284,362 | 11/1918 | Kempton. |
| 1,360,165 | 11/1920 | Zenk. |
| 2,382,857 | 8/1945 | Camilli _____ 29—155.57 X |
| 2,696,658 | 12/1954 | Polard _____ 29—155.54 |
| 2,953,757 | 9/1960 | Yarrick et al. _____ 264—272 X |
| 3,010,182 | 11/1961 | Quinlan _____ 29—155.54 |
| 3,046,604 | 7/1962 | Graham et al. _____ 18—36 |
| 3,058,156 | 10/1962 | O'Connor _____ 18—36 |
| 3,103,737 | 9/1963 | Elsworth _____ 310—42 X |

WHITMORE A. WILTZ, *Primary Examiner.*

JOHN F. CAMPBELL, *Examiner.*